(12) United States Patent
Chittattukara et al.

(10) Patent No.: US 10,047,269 B2
(45) Date of Patent: Aug. 14, 2018

(54) TREATMENT FLUIDS COMPRISING FINGER MILLET AND METHODS OF USE

(71) Applicant: HALLIBURTON ENERGY SERVICES, INC., Houston, TX (US)

(72) Inventors: Shoy George Chittattukara, Thrissur (IN); Ragi Lohidakshan Poyyara, Pune (IN); Saumitra Das, Arambagh-Hooghly (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/503,985

(22) PCT Filed: Sep. 18, 2014

(86) PCT No.: PCT/US2014/056306
§ 371 (c)(1),
(2) Date: Feb. 14, 2017

(87) PCT Pub. No.: WO2016/043749
PCT Pub. Date: Mar. 24, 2016

(65) Prior Publication Data
US 2017/0275517 A1    Sep. 28, 2017

(51) Int. Cl.
*C09K 8/08* (2006.01)
*C09K 8/516* (2006.01)
*C09K 8/90* (2006.01)
*C09K 8/68* (2006.01)

(52) U.S. Cl.
CPC ............... *C09K 8/08* (2013.01); *C09K 8/516* (2013.01); *C09K 8/685* (2013.01); *C09K 8/90* (2013.01); *C09K 2208/26* (2013.01)

(58) Field of Classification Search
CPC .. C09K 8/08; C09K 8/51; C09K 8/516; C09K 8/68; C09K 8/685; C09K 8/90; C09K 2208/26
See application file for complete search history.

(56) References Cited

U.S. PATENT DOCUMENTS

| 4,997,581 A | 3/1991 | Williamson et al. |
| 5,118,664 A | 6/1992 | Burts, Jr. |
| 5,363,928 A | 11/1994 | Wittliff |
| 5,801,127 A | 9/1998 | Duhon, Sr. |

(Continued)

FOREIGN PATENT DOCUMENTS

EP    2444413 A1 *  4/2012  ............. C09K 8/035

OTHER PUBLICATIONS

International Search Report and Written Opinion; PCT Application No. PCT/US2014/056306; dated Jun. 1, 2015.

*Primary Examiner* — Zakiya W Bates
*Assistant Examiner* — Crystal J Miller
(74) *Attorney, Agent, or Firm* — Polsinelli PC (57) ABSTRACT

The present disclosure relates to a well treatment fluid comprising finger millet, a breaker package, and a continuous aqueous phase. The present disclosure also relates to a method for treating at least a portion of a subterranean well comprising forming an aqueous treatment fluid comprising (i) finger millet, (ii) a breaker package comprising at least one breaker, and (iii) a continuous aqueous phase; and introducing the treatment fluid into at least a portion of the subterranean well.

17 Claims, 2 Drawing Sheets

(56) References Cited

U.S. PATENT DOCUMENTS

| | | | | |
|---|---|---|---|---|
| 6,016,879 | A * | 1/2000 | Burts, Jr. | C09K 8/035 |
| | | | | 166/295 |
| 6,422,314 | B1 | 7/2002 | Todd et al. | |
| 6,767,867 | B2 | 7/2004 | Chatterji et al. | |
| 7,462,581 | B2 | 12/2008 | Munoz, Jr. et al. | |
| 7,686,080 | B2 | 3/2010 | Todd et al. | |
| 7,888,297 | B2 | 2/2011 | Hanes, Jr. et al. | |
| 2004/0023816 | A1 | 2/2004 | Burts, III | |
| 2005/0170973 | A1 | 8/2005 | Verret | |
| 2010/0270017 | A1 * | 10/2010 | Prasek | C09K 8/74 |
| | | | | 166/300 |
| 2010/0298177 | A1 | 11/2010 | Robb | |
| 2010/0314113 | A1 * | 12/2010 | Huang | C09K 8/516 |
| | | | | 166/300 |
| 2013/0137610 | A1 * | 5/2013 | Huang | C09K 8/516 |
| | | | | 507/218 |
| 2013/0306317 | A1 | 11/2013 | Karadkar et al. | |
| 2013/0333886 | A1 * | 12/2013 | George | C09K 8/514 |
| | | | | 166/278 |

* cited by examiner

TREATMENT FLUIDS COMPRISING FINGER MILLET AND METHODS OF USE

CROSS-REFERENCE TO RELATED APPLICATIONS

This application is a national stage entry of PCT/US2014/056306 filed Sep. 18, 2014, said application is expressly incorporated herein in its entirety.

FIELD

The field of the disclosure relates to treatment fluids comprising finger millet and methods of using the treatment fluids for improving the extraction of crude oil or natural gas from subterranean formations.

BACKGROUND

In the context of production from a well, oil and gas are understood to refer to crude oil and natural gas. Oil and gas are naturally occurring hydrocarbons in certain subterranean formations.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

There are conventional and non-conventional types of reservoirs. In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation.

To produce oil or gas, a well is drilled into a subterranean formation that is an oil or gas reservoir. Generally, the greater the depth of the formation, the higher the bottomhole static temperature and pressure of the formation.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation.

Well services can include various types of treatments that are commonly performed in a wellbore or subterranean formation. For example, during completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control. Of course, other well treatments and treatment fluids are known in the art.

Fluid-Loss can be problematic in the treatment of subterranean wells. Fluid loss typically refers to the undesirable leakage of a fluid phase of any type of well fluid into the permeable matrix of a subterranean well. Fluid-loss control refers to treatments designed to reduce such undesirable leakage. Providing effective fluid-loss control for well fluids during certain stages of well operations can be beneficial.

One approach to fluid-loss control is to substantially reduce the permeability of the matrix of the zone with a fluid-loss control material that blocks the permeability at or near the face of the rock matrix of the subterranean well. For example, the fluid-loss control material may be a particulate that has a size selected to bridge and plug the pore throats of the matrix. All else being equal, the higher the concentration of the appropriately sized particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filter cake. Depending on the nature of a fluid phase and the filter cake, such a filter cake may help block the further loss of a fluid phase (referred to as a filtrate) into the subterranean formation. A fluid-loss control material is specifically designed to lower the volume of a filtrate that passes through a filter medium.

After application of a filter cake, however, it may be desirable to restore permeability into the formation. If the formation permeability of the desired producing well is not restored, production levels from the formation can be significantly lower. Any filter cake or any solid or polymer filtration into the matrix of the well resulting from a fluid-loss control treatment must be removed to restore the formation's permeability, preferably to at least its original level. This is often referred to as clean up.

BRIEF DESCRIPTION OF THE DRAWINGS

Implementations of the present technology will now be described, by way of example only, with reference to the attached figures, wherein.

It should be understood that the various embodiments are not limited to the arrangements and instrumentality shown in the drawings.

DETAILED DESCRIPTION

The instant disclosure relates to a treatment fluid comprising finger millet and to methods for treating subterranean wells with the treatment fluid.

Finger millet (*Eleusine coracana*) is an annual plant widely grown as a cereal in the arid areas of Africa and Asia. It is sometimes referred to as African finger millet, red millet, caracan millet, koracan, and ragi. Finger millet is native to the Ethiopian Highlands. It is very adaptable to higher elevations and is grown in the Himalaya up to 2,300 meters in elevation.

When powdered, the particulates of its husk (external covering) are less soluble in water than the millet itself. Due to this difference in solubility, it forms a non-uniform mixture of particulates in water. This non-uniformity helps in plugging all sizes of pore throats in a subterranean formation face. It is also useful in forming a mud filter cake, it is friendly to the environment, and it is cost effective due its abundance. Moreover, it can be used up to a temperature of at least 200° F. and is easily dispersed in treatment fluids. Finally, the use of finger millet is beneficial because no external breaker is required to dissolve remaining filter cakes.

Treatment fluids can serve many purposes, including, for example fracturing, lubricating a drill bit, removing cuttings form a wellbore, and providing stability to a well. To accomplish their purposes, treatment fluids possess several characteristics. One common characteristic is the ability to form a coating or "filter cake" on the wall of the wellbore or borehole. The filter cake serves to stabilize the borehole and prevent loss of the liquid portion of the treatment fluid through the walls of the borehole into the adjoining formations. This loss of liquid, commonly referred to as "fluid loss," is a function of many variables such as the composition of the treatment fluid, the types of formations encountered in the subterranean well, temperatures and pressure in the borehole, etc.

Although a filter cake may be desirable during treatment of a wellbore, removal of the cake is frequently desirable after treatment, as the filter cake may interfere with production of oil and gas from the formation into the well. External breakers are commonly used to assist in removing the filter cake. An external breaker is a breaker that is not included in the treatment fluid, but is applied to the filter cake separately, i.e., it is a breaker that is "external" to the treatment fluid. The treatment fluids of the instant disclosure are unique in that external breakers are not required for removal of the filter cake. Instead, according to certain examples, the treatment fluid of the present disclosure uses internal breakers.

In some examples, the treatment fluid of the present disclosure comprises: (i) finger millet; (ii) a breaker package comprising at least one breaker; and (iii) a continuous aqueous phase. The finger millet may have a particle size of about 1 micron to about 5000 microns (about 0.001 mm to about 5 mm) when dissolved in water. In certain cases, the particle size may be smaller or larger than about 1 to about 5000 microns. In other examples, the particle size may be from about 1, 10, 25, 50, 75, 100, 150, or 200 microns to about 200, 500, 1000, 2000, 3000, 4000, or 5000 microns. In some instances, the particle size distribution for the finger millet may be: D(0.1) of about 1 µM to about 500 µM; D(0.5) of about 100 µM to about 1000 µM; and D(0.9) of about 200 µM to about 5000 µM. Alternatively, the particle size distribution of the finger millet may be: D(0.1) of about 1 µM to about 10 µM; D(0.5) of about 50 µM to about 100 µM; and D(0.9) of about 200 µM to about 400 µM.

The breaker package, in some instances, may comprise, for example, a breaker selected from the group consisting of an acid, an oxidizer (such as a peroxide, a persulfate, a perborate, an oxyacid of a halogen, an oxyanion of a halogen, chlorous acid, hypochlorous acid), an enzyme, and combinations thereof. Likewise, the breaker package may comprise, for example, a breaker selected from the group consisting of formic acid, tert-butyl hydrogen peroxide, ferric chloride, magnesium peroxide, magnesium peroxy-diphosphate, strontium peroxide, barium peroxide, calcium peroxide, magnesium perborate, barium bromate, sodium chlorite, sodium bromate, sodium persulfate, sodium peroxydisulfate, ammonium chlorite, ammonium bromate, ammonium persulfate, ammonium peroxydisulfate, potassium chlorite, potassium bromate, potassium persulfate, potassium peroxydisulfate, one or more oxidizable metal ions (i.e., a metal ion whose oxidation state can be increased by the removal of an electron, such as copper, cobalt, iron, manganese, vanadium), and mixtures thereof.

In some examples, the treatment fluid of the present disclosure comprises a solid breaker. For example, the solid breaker maybe a metal oxide, such as magnesium peroxide. The amount of solid breaker may vary depending on need, but can be in an amount from about 0.25 to about 10 lbs. per thousand gal. of the well treatment fluid. In some instances, the amount of solid breaker may be less than or greater than this range. Likewise, the amount of solid breaker may be in an amount from about 0.1, 0.25, 0.5, 0.75, 1.0, 1.5, 3.0, or 4.0 to about 5.0, 6.0, 7.0, 7.5, 8.0, 9.0, or 10 lbs per thousand gal. of the treatment fluid.

In some examples, the treatment fluid comprises both a liquid breaker and a solid breaker. For instance, the liquid breaker may be selected from the group consisting of formic acid, tiertiary butyl hydrogen peroxide, and a combination thereof. If a solid breaker is also present, it may be, for example, a metal oxide, such as magnesium oxide.

The amount of liquid breaker may vary depending on need, but can be in an amount from about 0.25 to about 10 gal. per thousand gal. of the treatment fluid. In some instances, the amount of liquid breaker may be less than or greater than this range. Likewise, the amount of liquid breaker may be in an amount from about 0.1, 0.25, 0.5, 0.75, 1.0, 1.5, 3.0, or 4.0 to about 5.0, 6.0, 7.0, 7.5, 8.0, 9.0, or 10 gal. per thousand gal. of the treatment fluid.

In some examples, the treatment fluid further comprises a breaker activator. For example, the breaker activator may be a metal selected from the group consisting of chromium, copper, manganese, cobalt, nickel, iron, and vanadium. More specifically, in some examples, the breaker activator may be selected from the group consisting of vanadium acetyl acetonate, ferric chloride, and manganese acetyl acetonate. In some cases, the breaker activator is ferric chloride.

In some examples, the treatment fluid of the present disclosure may comprise a viscosity-increasing agent. For example, the viscosity-increasing agent may be a water-soluble polymer, such as those selected from the group consisting of xanthan, guar, a guar derivative, cellulose, modified cellulose, diutan, and a combination thereof.

The present disclosure also relates to methods for treating at least a portion of a subterranean well, the methods comprising, for example, introducing the treatment fluid described herein into at least a portion of a subterranean well. For instance, the method could include forming an aqueous treatment fluid comprising: (i) finger millet having a particle size of about 1 to about 5000 microns (about 0.001 mm to about 5 mm); (ii) a breaker package comprising a solid and a liquid breaker; (iii) a continuous aqueous phase; and (iv) a water-soluble polymer; and introducing the treatment fluid into at least a portion of the subterranean well using one or more pumps.

Other components useable in the treatment fluids and methods of using the fluids are individually described in more detail below.

Breakers

After an aqueous well treatment fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of well fluids are called breakers. No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any crosslinking bonds existing between polymer chains.

For example, the breaker may be a peroxide with oxygen-oxygen single bonds in the molecular structure. These peroxide breakers may be hydrogen peroxide or other material such as a metal peroxide that provides peroxide or hydrogen peroxide for reaction in solution. A peroxide breaker may be a so-called stabilized peroxide breaker in which hydrogen peroxide is bound or inhibited by another compound or molecule(s) prior to its addition to water but is released into solution when added to water.

Examples of suitable stabilized peroxide breakers include the adducts of hydrogen peroxide with other molecules, and may include carbamide peroxide or urea peroxide ($CH_4N_2OH_2O_2$), percarbonates, such as sodium percarbonate ($2Na_2CO_3 3_2O_2$), potassium percarbonate and ammonium percarbonate. The stabilized peroxide breakers may also include those compounds that undergo hydrolysis in water to release hydrogen peroxide, such sodium perborate. A stabilized peroxide breaker may be an encapsulated peroxide. The encapsulation material may be a polymer that can degrade over a period of time to release the breaker and may be chosen depending on the release rate desired. Degradation of the polymer can occur, for example, by hydrolysis, solvolysis, melting, or other mechanisms. The polymers may be selected from homopolymers and copolymers of glycolate and lactate, polycarbonates, polyanhydrides, polyorthoesters, and polyphosphacenes. The encapsulated peroxides may be encapsulated hydrogen peroxide, encapsulated metal peroxides, such as sodium peroxide, calcium peroxide, zinc peroxide, etc. or any of the peroxides described herein that are encapsulated in an appropriate material to inhibit or reduce reaction of the peroxide prior to its addition to water.

The peroxide breaker, stabilized or unstabilized, is used in an amount sufficient to break the cross-linking. Lower temperatures may require greater amounts of the breaker. In many, if not most applications, the peroxide breaker may be used in an amount of from about 0.001% to about 20% by weight of the treatment fluid, more particularly from about 0.005% to about 5% by weight of the treatment fluid, and more particularly from about 0.01% to about 2% by weight of the treatment fluid.

Additional examples of breakers include: ammonium, sodium or potassium persulfate; sodium peroxide; sodium chlorite; sodium, lithium or calcium hypochlorite; bromates; perborates; permanganates; chlorinated lime; potassium perphosphate; magnesium monoperoxyphthalate hexahydrate; and a number of organic chlorine derivatives such as N,N'-dichlorodimethylhydantoin and N-chlorocyanuric acid and/or salts thereof. The specific breaker employed may depend on the temperature to which the fracturing fluid is subjected. At temperatures ranging from about 50° C. to about 95° C., an inorganic breaker or oxidizing agent, such as, for example, $KBrO_3$, and other similar materials, such as $KClO_3$, $KIO_3$, perborates, persulfates, permanganates (for example, ammonium persulfate, sodium persulfate, and potassium persulfate) and the like, are used to control degradation of the fracturing fluid. At about 90 to 95° C. and above, typical breakers such sodium bromate, may be used.

Breaking aids or catalysts may be used with the peroxide breaker. The breaker aid may be an iron-containing breaking aid that acts as a catalyst. The iron catalyst is a ferrous iron (II) compound. Examples of suitable iron (II) compounds include, but are not limited to, iron (II) sulfate and its hydrates (such as, for example, ferrous sulfate heptahydrate), iron (II) chloride, and iron (II) gluconate. Iron powder in combination with a pH adjusting agent that provides an acidic pH may also be used. Other transition metal ions can also be used as the breaking aid or catalyst, such as manganese (Mn).

Magnesium Peroxide is an oxidizer which slowly decomposes to release oxygen. Since magnesium peroxide is a powdered solid, it becomes an integral part of the filter cake. Due to the extremely low solubility of magnesium peroxides it remains stable for extended periods of time in alkaline environment and within the filter cake. The magnesium peroxide, when exposed to an acidic solution, it releases hydrogen peroxide which degrades the polysaccharide type polymers and open-up the external filter cake.

Continuous Aqueous Phase

The treatment fluid is preferably a water-based fluid wherein the continuous aqueous phase of the fluid is greater than 50% by weight water. Typically, the water is present in the treatment fluids in an amount at least sufficient to substantially hydrate any viscosity-increasing agent. In some examples, the aqueous phase, including the dissolved materials therein, may be present in the treatment fluids in an amount in the range from about 5% to 100% by volume of the treatment fluid.

Typically, the water for use in the treatment fluid does not contain anything that would adversely interact with the other components used in the well fluid or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some examples, the aqueous phase of the treatment fluid may comprise a brine. The brine chosen should be compatible with the formation and should have a sufficient density to provide the appropriate degree of well control.

Salts may optionally be included in the treatment fluids for many purposes. For example, salts may be added to a water source, for example, to provide a brine, and a resulting treatment fluid, having a desired density. Salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid.

Suitable salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Viscosity-Increasing Agents

Certain kinds of polymers can be used to increase the viscosity of the treatment fluid. In general, the purpose of using a polymer is to increase the ability of the fluid to suspend and carry a particulate material. Polymers for increasing the viscosity of the fluid are preferably soluble in the external phase of a fluid. Polymers for increasing the viscosity of a fluid can be naturally occurring polymers such as polysaccharides, derivatives of naturally occurring polymers, or synthetic polymers.

Treatment fluids used in high volumes, such as fracturing fluids, are usually water-based. Efficient and inexpensive viscosity-increasing agents for water include certain classes of water-soluble polymers.

As will be appreciated by a person of skill in the art, the dispersibility or solubility in water of a certain kind of polymeric material may be dependent on the salinity or pH of the water. Accordingly, the salinity or pH of the water can be modified to facilitate the dispersibility or solubility of the water-soluble polymer. In some cases, the water-soluble polymer can be mixed with a surfactant to facilitate its dispersibility or solubility in the water or salt solution utilized.

The water-soluble polymer can have an average molecular weight in the range of from about 50,000 to about 20,000,000, or from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

The viscosity-increasing agent can be provided in any form that is suitable for the particular treatment fluid or application. For example, the viscosity-increasing agent can be provided as a liquid, gel, suspension, or solid additive that is admixed or incorporated into a treatment fluid.

The viscosity-increasing agent should be present in a treatment fluid in a form and in an amount at least sufficient to impart the desired viscosity to a treatment fluid. For example, the amount of viscosity-increasing agent used in the treatment fluids may vary from about 0.25 pounds per 1,000 gallons of treatment fluid ("lbs/Mgal") to about 200 lbs/Mgal. In other examples, the amount of viscosity-increasing agent included in the treatment fluids may vary from about 10 lbs/Mgal to about 80 lbs/Mgal. In another example, about 20 pounds to about 70 pounds (lbs) of water-soluble polymer per 1,000 gallons (Mgal) of water (equivalent to about 2.4 g/L to about 8.4 g/L).

The viscosity of a fluid at a given concentration of viscosity-increasing agent can be greatly increased by cross-linking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

Sometimes, however, crosslinking is undesirable, as it may cause the polymeric material to be more difficult to break and it may leave an undesirable residue in the formation.

It should be understood that merely increasing the viscosity of a fluid may only slow the settling or separation of distinct phases and does not necessarily stabilize the suspension of any particles in the fluid.

Certain viscosity-increasing agents can also help suspend a particulate material by increasing the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/$cm^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the association of surfactant molecules to form viscosifying micelles.

Viscoelastic surfactants may be cationic, anionic, or amphoteric in nature. The viscoelastic surfactants can comprise any number of different compounds, including methyl ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Hydraulic Fracturing

Hydraulic fracturing is a common stimulation treatment encompassed within the scope of the present disclosure. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

The formation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which may be observable at the wellhead. After initially breaking down the formation, the fracture may then propagate more slowly, at the same pressure or with little pressure increase. It can also be detected with seismic techniques.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand sized is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least about 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes of proppant can be used as well. In conventional reservoirs, if sand is used, it commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

A treatment fluid may be a carrier fluid for particulates. For example, a proppant used in fracturing or a gravel used in gravel packing may have a much different density than the carrier fluid. For example, sand has a specific gravity of about 2.7, whereas water has a specific gravity of 1.0 at Standard Laboratory conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Chelating Agents

In some examples, the treatment fluid may optionally comprise a chelating agent. When added to the treatment fluids, the chelating agent may chelate any dissolved iron (or other divalent or trivalent cation) that may be present in the aqueous fluid. Such chelating may prevent such ions from crosslinking the viscosity-increasing agent molecules.

Any suitable chelating agent may be used. Examples of suitable chelating agents include, but are not limited to, an anhydrous form of citric acid, commercially available under the tradename "Fe-2™" Iron Sequestering Agent from Halliburton Energy Services, Inc., of Duncan, Okla. Another example of a suitable chelating agent is a solution of citric acid dissolved in water, commercially available under the tradename "Fe-2A™" buffering agent from Halliburton Energy Services, Inc., of Duncan, Okla. Other chelating agents include, inter alia, nitrilotriacetic acid ("NTA"), any form of ethylene diamine tetracetic acid ("EDTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenyl acetic) acid ("EDDHA"), glucoheptonic acid, gluconic acid, sodium citrate, phosphonic acid, salts thereof, and the like. In some examples, the chelating agent may be a sodium or potassium salt.

Generally, the chelating agent may be present in an amount sufficient to prevent crosslinking of the viscosity-increasing agent molecules by any free iron (or any other divalent or trivalent cation) that may be present. In one example, the chelating agent may be present in an amount of from about 0.02% to about 5.0% by weight of the treatment fluid. In another example, the chelating agent is present in an amount in the range of from about 0.02% to about 2.0% by weight of the treatment fluid. One of ordinary skill in the art with the benefit of this disclosure will be able to determine the proper concentration of a chelating agent for a particular application.

pH and pH Adjusters

Typically, the pH of the treatment fluid is in the range of about 1 to about 10. In acidizing treatments, the pH is often less than about 4.5.

In certain examples, the treatment fluids can include a pH-adjuster. The pH-adjuster may be present in the treatment fluids in an amount sufficient to maintain or adjust the pH of the fluid. In some examples, the pH-adjuster may be present in an amount sufficient to maintain or adjust the pH of the fluid to a pH in the range of from about 1 to about 4 at the time of introducing into the well.

In general, one of ordinary skill in the art, with the benefit of this disclosure, will recognize the appropriate pH-adjuster and amount thereof to use for a chosen application.

It should be understood that as the degradable polymer degrades, it may release acid. For example, a polylactide may degrade to release lactic acid, which may lower the pH in situ.

The treatment fluids of the present disclosure also may comprise a pH adjusting agent. The pH adjusting agents may be included in the fluid to facilitate the formation of the crosslinking. In certain examples in which the pH is to be increased, suitable pH adjusting agents may comprise a base. Examples of suitable bases include, but are not limited to, sodium hydroxide, potassium hydroxide, lithium hydroxide, sodium carbonate, potassium carbonate, ammonium hydroxide or a combination thereof. Typically, an appropriate pH for forming and maintaining the crosslinked fracturing fluid of the present disclosure is at least 7, or ranges from about 7 to about 12, about 7.5 to about 10, or about 8 to about 10.

In other examples in which the pH is to be decreased, suitable pH adjusting agents comprise an acid. For example, the acid may be fumaric acid, formic acid, acetic acid, acetic anhydride, hydrochloric acid, hydrofluoric acid, hydroxyfluoroboric acid, polyaspartic acid, polysuccinimide, or a combination thereof. The appropriate pH adjusting agent and amount used may depend on the formation characteristics and conditions, on the breaking or crosslinking time desired, on the nature of the cationic cellulose, and on other factors known to individuals skilled in the art with the benefit of this disclosure.

The treatment fluids of the present disclosure may further comprise a buffer. Buffers may be used to maintain a treatment fluid's pH in a limited range. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer may be included in an amount sufficient to maintain the pH of such viscosified treatment fluids at a desired level. In an example, a buffer may be included in an amount of from about 0.5% to about 10% by weight of the treatment fluid. One of ordinary skill in the art, with the benefit of this disclosure, will recognize the appropriate buffer and amount of the buffer to use for a chosen application.

Other Additives

In certain examples, the treatment fluids also can optionally comprise other commonly used well fluid additives, such as those selected from the group consisting of surfactants, bactericides, other fluid-loss control additives, stabilizers, chelating agents, scale inhibitors, corrosion inhibitors, hydrate inhibitors, clay stabilizers, salt substitutes (such as trimethyl ammonium chloride), relative permeability modifiers (such as HPT-1™ modifiers commercially available from Halliburton Energy Services, Duncan, Okla.), sulfide scavengers, fibers, nanoparticles, and any combinations thereof.

Illustrations

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 1:
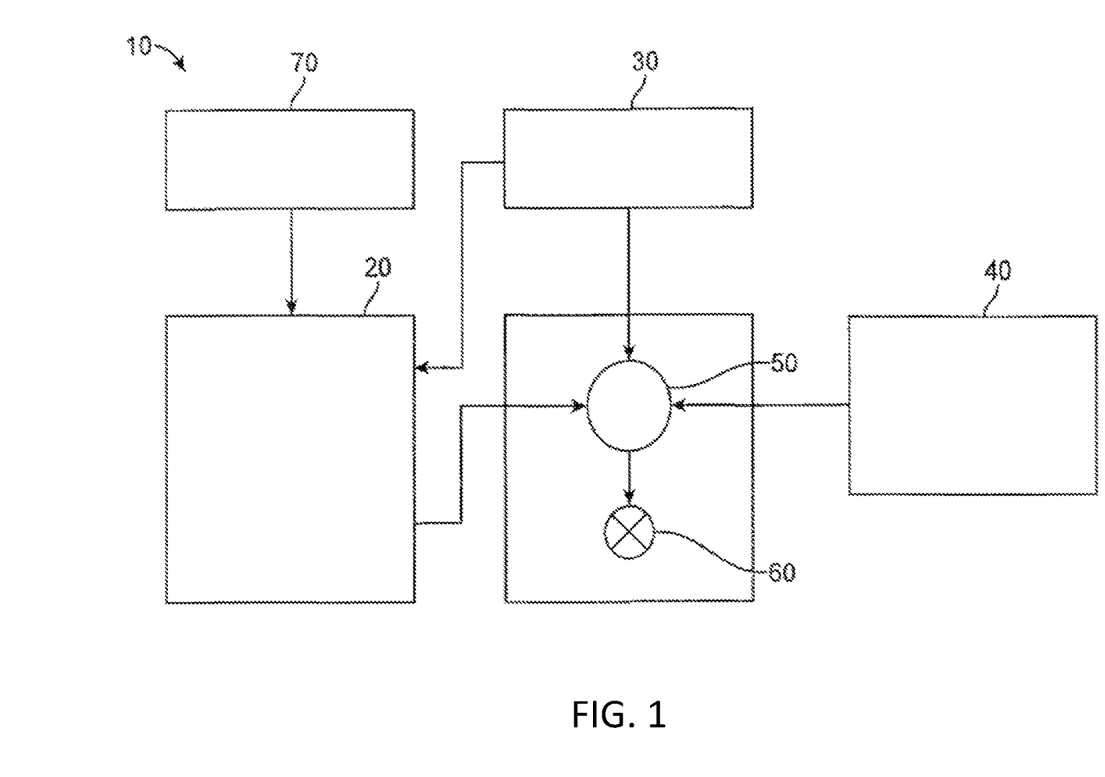
FIG. 1 is a diagram illustrating an example of a fracturing system that may be used in accordance with certain embodiments of the present disclosure.
Figure 2:
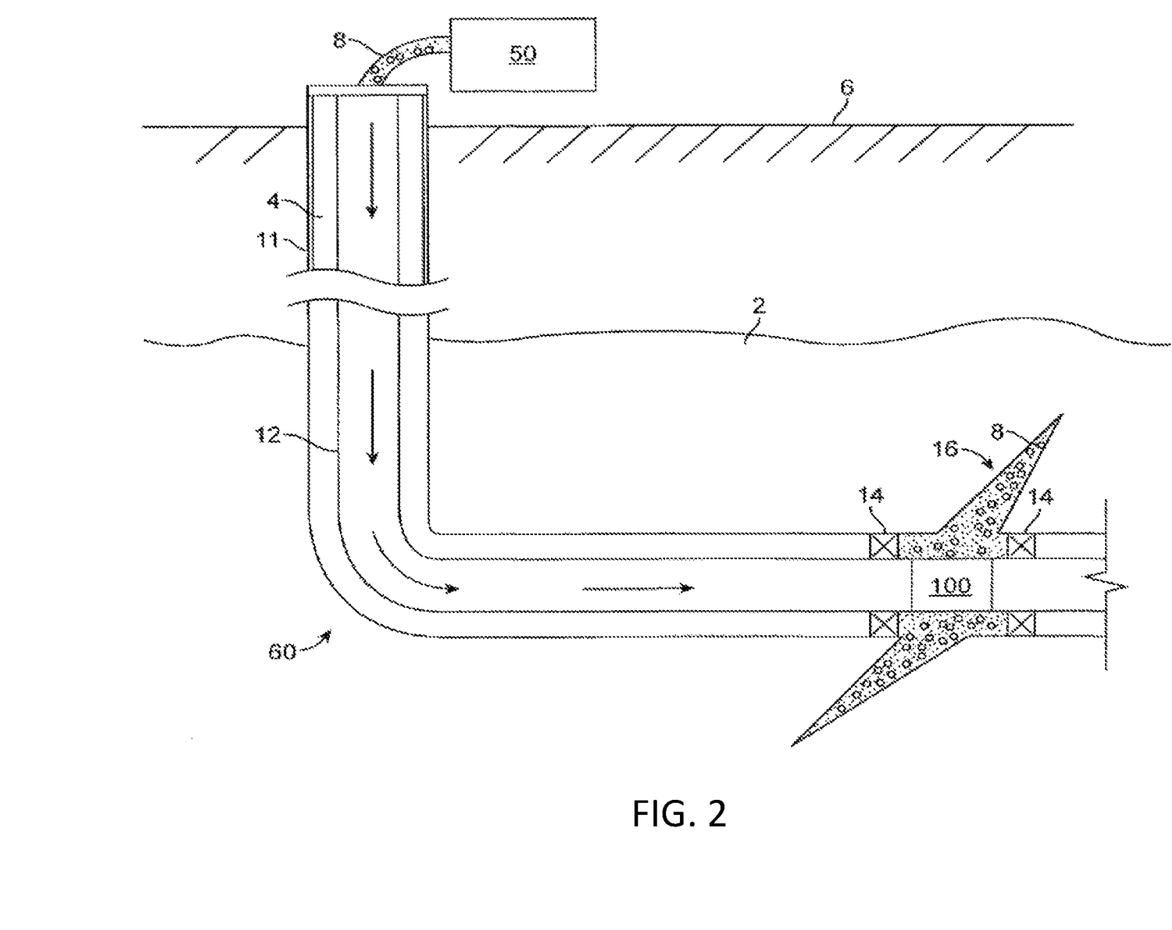
FIG. 2 is a diagram illustrating an example of a subterranean formation in which a fracturing operation may be performed in accordance with certain embodiments of the present disclosure.

An exemplary fracturing system is illustrated in FIGS. 1 and 2. As described hereinabove, the disclosed multi-acting downhole tool 100 can be utilized in such fracturing procedures and can directly and/or indirectly affect one or more components or pieces of equipment associated with the depicted fracturing system 10. In this example, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used in fracturing the formation, for example, by being pumped through the multi-acting downhole tool 100 (see FIG. 2) when in the open configuration. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 and out through the multi-acting downhole tool 100 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant through the multi-acting downhole tool 100 to the target subterranean zone.

FIG. 2 illustrates a well 60 performing a fracturing operation in a portion of a subterranean formation of interest 2 surrounding a well bore 4. The well bore 4 extends from the surface 6, and the fracturing fluid 8 is applied to a portion of the subterranean formation 2 surrounding the horizontal portion of the well bore through, for example, the multi-acting downhole tool 100. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The working string 12 may include coiled tubing, jointed pipe, and/or other structures that allow fluid to flow into the well bore 4. The working string 12 can include flow control devices that control the flow of fluid from the interior of the working string 12 into the subterranean zone 2.

The working string 12 and/or the well bore 4 may include one or more sets of packers 14 that seal the annulus between the working string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

A treatment fluid can be prepared at the job site, prepared at a plant or facility prior to use, or certain components of the well fluid can be pre-mixed prior to use and then transported to the job site. Certain components of the treatment fluid may be provided as a "dry mix" to be combined with fluid or other components prior to or during introducing the well fluid into the well.

In certain examples, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a treatment fluid into a well is within a relatively short period after forming the treatment fluid, e.g., less within 30 minutes to one hour. Sometimes, the step of delivering the well fluid is immediately after the step of forming the well fluid, which is "on the fly."

It should be understood that the step of delivering a well fluid into a well can advantageously include the use of one or more fluid pumps. In an example, the step of introducing is at a rate and pressure below the fracture pressure of the treatment zone. In an example, the step of introducing comprises introducing under conditions for fracturing a treatment zone. The fluid is introduced into the treatment zone at a rate and pressure that are at least sufficient to create or extend at least one fracture in the zone.

After the step of introducing a treatment fluid into a well, the methods can include a step of allowing degradable materials to degrade. This preferably occurs with time under the conditions in the zone of the subterranean fluid.

In an example, the step of flowing back is within 24 hours of the step of introducing. In another example, the step of flowing back is within 16 hours of the step of introducing. Preferably, after any such well treatment, a step of producing hydrocarbon from the subterranean formation is the desirable objective.

EXAMPLES

Example 1

Finger millet was ground to attain the PSD (Particle Size Distribution) shown in Table 1 below.

TABLE 1

| | Finger Millet | | | | | |
| --- | --- | --- | --- | --- | --- | --- |
| | Dry Powder | | | Dissolved in Water | | |
| | Min | Max | Avg | Min | Max | Avg |
| D(0.01) µM | 12.67 | 13.26 | 12.86 | 4.5 | 3.2 | 3.85 |
| D(0.05) µM | 84.46 | 88.91 | 86.22 | 71.44 | 76.14 | 74.44 |
| D(0.9) µM | 297.86 | 315.96 | 309.20 | 306.87 | 328.68 | 319.63 |

The table above shows that about 10% of particulates have an average diameter of 12.86 in dry powdered form and 3.85 when dissolved in water. Around 50% of particulates have an average diameter of 86.22 in dry powdered form and 74.44 when dissolved in water. This indicates that the smaller particulates are soluble in water while the higher diameter particulates (derived from the husk) are sparingly soluble in water. This PSD analysis also confirms that there is a wide variation in particulate sizes in a given sample of powdered finger millet. This makes it particularly suitable in formation of all pore throat sizes, i.e., it is useable in all types of formations with different permeability.

The finger millet from above was combined with water and a breaker package comprising formic acid, teriary butyl hydrogen peroxide, ferric chloride, and $MgO_2$, in the amounts shown in the table 2 below.

TABLE 2

| Breaker Package | |
| --- | --- |
| Breaker | Concentration |
| Formic Acid | 10 gpt (liquid) |
| Tertiary butyl hydrogen peroxide | 1 gpt (liquid) |
| Ferric chloride | 0.25 gpt (liquid) |
| $MgO_2$ | 5 lb/gal (solid) |

2 g of finger millet was added to 100 mL of the aqueous treatment fluid. After 48 hours, the weight of the finger millet was determined by extracting the particles with filter paper, drying them, and weighing them. After 48 hours, only 0.5 grams of finger millet was recovered. This indicates degradation of the finger millet by the breaker package over time. Table 3 below shows the results.

TABLE 3

| Final Results | |
| --- | --- |
| Initial Weight of Sample | Final Weight of Sample after 48 Hours |
| 2 g in 100 mL | 0.5 g in 100 mL |

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

In the context of production from a well, oil and gas are understood to refer to crude oil and natural gas. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

As used herein, a subterranean formation having greater than 50% by weight of inorganic carbonates (e.g., limestone or dolomite) is referred to as a "carbonate formation".

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introduced at least into and through the wellhead. According to various techniques known in the art, tubulars, equipment, tools, or well fluids can be directed from the wellhead into any desired portion of the wellbore. Additionally, a well fluid can be directed from a portion of the wellbore into the rock matrix of a zone.

As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (32 $m^3$), it is sometimes referred to in the art as a wash, dump, slug, or pill.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

Broadly, a zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore. As used herein, "into a treatment zone" means into and through the wellhead and, additionally, through the wellbore and into the treatment zone.

The near-wellbore region of a zone is usually considered to include the matrix of the rock within a few inches of the borehole. As used herein, the near-wellbore region of a zone is considered to be anywhere within about 12 inches of the wellbore. The far-field region of a zone is usually considered the matrix of the rock that is beyond the near-wellbore region.

As used herein, unless the context otherwise requires, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) up to about 5 millimeters.

A particulate will have a particle size distribution ("PSD"). As used herein, "the size" of a particulate can be determined by methods known to persons skilled in the art.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

A common approach to define the particle size distribution width is to cite three values, the d(0.10), d(0.50), and the d(0.90). The d(0.50), which is sometimes referred to as the "D50" or the median particle size, is defined as the diameter where half of the particles are smaller and half are larger than the size. Similarly, 10 percent of the distribution lies below the d(0.10) or "D10" size, and 90 percent of the distribution lies below the d(0.90) or "D90" size.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means the mid-point of the industry-accepted mesh size range for the particulate.

Particulate smaller than about 400 U.S. Standard Mesh is usually measured or separated according to other methods because small forces such as electrostatic forces can interfere with separating tiny particulate sizes using a wire mesh.

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

Unless otherwise specified or unless the context otherwise clearly requires, any ratio or percentage means by weight.

Unless otherwise specified or unless the context otherwise requires, the phrase "by weight of the water", means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons.

Unless otherwise stated, mesh sizes are in U.S. Standard Mesh.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. An aqueous fluid-loss control treatment fluid for forming a filter cake on the wall of a wellbore, the treatment fluid comprising:
   (i) finger millet;
   (ii) a breaker package comprising at least one liquid breaker and at least one solid breaker; and
   (iii) a continuous aqueous phase.

2. The aqueous well treatment fluid of claim 1, wherein the finger millet has a particle size of about 1 to about 5000 microns when dissolved in water.

3. The aqueous well treatment fluid of claim 1, wherein the breaker package comprises at least one breaker selected from the group consisting of an acid, an oxidizer, an enzyme, and combinations thereof.

4. The aqueous well treatment fluid of claim 1, wherein the breaker package comprises at least one breaker selected from the group consisting of formic acid, tert-butyl hydrogen peroxide, ferric chloride, magnesium peroxide, magnesium peroxydiphosphate, strontium peroxide, barium peroxide, calcium peroxide, magnesium perborate, barium bromate, sodium chlorite, sodium bromate, sodium persulfate, sodium peroxydisulfate, ammonium chlorite, ammonium bromate, ammonium persulfate, ammonium peroxydisulfate, potassium chlorite, potassium bromate, potassium persulfate, potassium peroxydisulfate, one or more oxidizable metal ions, and mixtures thereof.

5. The aqueous well treatment fluid of claim 1, wherein the at least one solid breaker is magnesium peroxide.

6. The aqueous well treatment fluid of claim 1, wherein the amount of solid breaker is from about 0.25 to about 10 lbs. per thousand gal. of the aqueous well fluid-loss control treatment fluid.

7. The aqueous well treatment fluid of claim 1, wherein the liquid breaker is selected from formic acid, tertiary butyl hydrogen peroxide, and a combination thereof.

8. The aqueous well treatment fluid of claim 1, wherein the breaker package comprises, as the at least one liquid breaker, formic acid, and tertiary butyl hydrogen peroxide; and as the at least one solid breaker, magnesium peroxide.

9. The aqueous well treatment fluid of claim 8, further comprising a breaker activator that is ferric chloride.

10. The aqueous well treatment fluid of claim 1, wherein the breaker package comprises a liquid breaker in an amount of about 0.25 to about 10 gal. per thousand gal. of the aqueous well treatment fluid.

11. The aqueous well treatment fluid of claim 1, further comprising a breaker activator.

12. The aqueous well treatment fluid of claim 11, wherein the breaker activator is a metal selected from the group consisting of chromium, copper, manganese, cobalt, nickel, iron, and vanadium.

13. The aqueous well treatment fluid of claim 12, wherein the breaker activator is selected from the group consisting of vanadium acetyl acetonate, ferric chloride, and manganese acetyl acetonate.

14. The aqueous well treatment fluid of claim 1, wherein the aqueous treatment fluid comprises:
(iv) a viscosity-increasing agent.

15. The aqueous well treatment fluid of claim 14, wherein the viscosity-increasing agent is a water-soluble polymer selected from the group consisting of xanthan, guar, a guar derivative, cellulose, modified cellulose, diutan, and a combination thereof.

16. A method for treating at least a portion of a subterranean well comprising introducing the aqueous well treatment fluid of claim 1 into at least a portion of a subterranean well.

17. A method for forming a filter cake on at least a portion of a wellbore wall in a subterranean well, the method comprising:
(A) forming an aqueous treatment fluid comprising:
  (i) finger millet having a particle size of about 1 to about 5000 microns (about 0.001 mm to about 5 mm);
  (ii) a breaker package comprising a solid and a liquid breaker;
  (iii) a continuous aqueous phase; and
  (iv) a water-soluble polymer; and
(B) introducing the treatment fluid into at least a portion of the subterranean well using one or more pumps.

* * * * *